Patented Mar. 8, 1949

2,464,049

UNITED STATES PATENT OFFICE 2,464,049

PROCESS FOR PREPARING MERCAPTANS

Louis A. Mikeska, Westfield, N. J., assignor to Standard Oil Development Company, a corporation of Delaware No Drawing. Application December 3, 1943, Serial No. 512,775

14 Claims. (Cl. 260—609)

This invention pertains to the preparation of mercaptans and in particular to the preparation of mercaptans by the reaction between olefins and hydrogen sulfide.

The reaction between olefins and $H_2S$ has been studied by various workers with little or no success from the standpoint of development of a procedure which gives good yields of mercaptans. Most of the processes proposed have been carried out at high temperatures and all have used high pressures of hydrogen sulfide. Catalysts used in such processes have included various metal sulfides, activated charcoal, activated fuller's earth, silica gel, thorium oxide, aluminum oxide, bentonite, antimony sulfide, phosphoric acid on charcoal, nickel on kieselguhr, nickel sulfide, sulfur, peroxides and actinic light. None of these processes has proven satisfactory since in most cases the yields of mercaptans were small and the quality of the reaction products was poor.

It is the object of this invention to provide the art with a novel method of preparing mercaptans by the reaction of olefins and hydrogen sulfide.

It is also the object of this invention to prepare mercaptans of good quality and in high yields by the reaction of olefins and hydrogen sulfide.

It is a further object of this invention to prepare mercaptans of good quality and in high yields by a reaction of olefins with hydrogen sulfide which avoids the use of high temperatures and pressures.

These and other objects will appear more clearly from the detailed description and claims which follow.

It has now been discovered that mercaptans of excellent qualities may be produced in high yields by condensing olefins with hydrogen sulfide at low temperatures and pressures in the presence of stannic chloride and the stannic sulfide which is formed during the reaction.

The reaction between an olefin and hydrogen sulfide in the presence of stannic chloride is best carried out in a batch operation. For example, stannic chloride is added to the olefin and the solution stirred while hydrogen sulfide is bubbled therein. Alternatively, liquid hydrogen sulfide may be dissolved in a suitable solvent such as chloroform, the resultant solution treated with a small amount of stannic chloride, whereupon the olefin is added to the resultant mixture. Anhydrous stannic chloride should be used. During the course of the reaction, some of the tin is precipitated as a mixed chlorosulfide. This precipitate may be responsible for part of the catalytic activity as shown by removing the same by filtration and reusing it as an effective catalyst. A considerable amount of the tin remains in solution, however, and does not precipitate as an insoluble tin sulfide or a mixed chlorosulfide. This soluble tin possesses high catalytic activity for the condensation of hydrogen sulfide with olefins.

Other stannic halides than the chloride can be used but because of the fact that they are solids rather than a liquid they are not as convenient to use. This inconvenience can, of course, be avoided by dissolving the stannic chloride in a suitable solvent such as carbon disulfide or an alkyl halide such as chloroform, methyl chloride, ethyl chloride or the like.

Upon completion of the reaction, the mercaptan can be recovered in various ways, for example, the reaction mixture may be subjected to steam distillation at atmospheric or below atmospheric pressure or the reaction mixture may be subjected to fractional distillation, the fraction boiling in the range of the desired mercaptan being extracted with an alkali, the desired mercaptan being separated by acidifying the alkaline extract and distilling off the mercaptan. It will be understood that the manner of separating the mercaptans formed is not critical to the present process and that various expedients well known in the art may be utilized to recover the mercaptans from the reaction mixture.

The olefins that may be used in accordance with the present invention include primary, secondary and tertiary mono-olefins such as octene-1, octene-2, trimethyl ethylene, diisobutylene, diamylene, triisobutylene or the like. Tertiary olefins, that is olefins with a double bond on a tertiary carbon atom, react particularly readily with hydrogen sulfide in the presence of stannic chloride. Primary and secondary olefins react less readily and, therefore, require the use of higher temperatures and higher pressures of hydrogen sulfide.

The reaction must be carried out with the olefin in a liquid phase or in a liquid solvent to obtain best results although there is a very slow reaction in gas phase as shown by reaction of isobutylene and H₂S in the presence of SnCl₄ in an empty glass reaction vessel. The boiling points of the olefins will therefore limit the maximum reaction temperature at any particular pressure. The reaction is generally carried out at temperatures ranging from room temperature to 90° C. High temperatures were avoided when the reaction proceeded readily at the lower temperatures. Temperatures as low as −80° C. were found successful for the reaction of an olefin and hydrogen sulfide in the presence of stannic chloride. The main portion of the addition of hydrogen sulfide to the olefin by this method is in accordance with Markownikov's rule.

The following examples are illustrative of the present invention.

Example 1

A glass reactor was charged with 224 gms. diisobutene. 10 cc. of anhydrous stannic chloride was added slowly from a dropping funnel while hydrogen sulfide gas was bubbled into the solution at such a rate that the temperature remained at 40–50° C. At the end of 2½ hrs. the temperature began to fall. After 3 hrs. there was still 2 cc. of SnCl₄ to be added and the temperature did not rise when this was added all at once. The hydrogen sulfide flow was then stopped.

The mixture was filtered from the yellow-brown precipitate. More precipitate formed on standing and still more when the filtrate was shaken with water and HCl. The emulsion which formed was broken, and the solid material was separated by centrifuging. The clear liquid product was washed with water, then with sodium bicarbonate solution and finally again with water. Distillation through a glass helices packed column gave 137 gms. of product boiling at 74–75° C./50 mm., which correspond to 53% of the theoretical yield of diisobutyl mercaptan. The product contained 21.07% sulfur.

Example 2

In a glass flask was placed 224 gms. of diisobutylene and 10 cc. of anhydrous stannic chloride. Hydrogen sulfide gas was passed into the solution. The temperature rose to 67° C. whereupon the H₂S flow was reduced and the flask cooled to keep the temperature at about 40–50° C. After there was no more heat of reaction liberated, aqueous sodium carbonate was added and the mixture steam distilled. The organic layer was distilled without drying to obtain 158.6 gms. of diisobutyl mercaptan boiling at 74–75.5/50 mm. ($n_D^{20}=1.4540$) which corresponds to about 54% of the theoretical yield.

Diisobutylene was placed in a steel bomb and connected by pipe to a tank containing liquid hydrogen sulfide, the pressure of hydrogen sulfide on the diisobutylene being that of the vapor pressure of hydrogen sulfide at room temperature. The bomb was shaken under these conditions for 20 hrs. The product was distilled through a glass helices packed column operating with 14 theoretical plates. Only 7% of the residue and drainback was obtained after the unchanged diisobutylene boiling from 96–102° C. was removed. This residue, when distilled, gave less than 1% of the original undistilled product boiling higher than 120° C. This experiment shows practically no reaction between H₂S and diisobutylene at 250 p. s. i. and room temperature.

Example 3

A glass reactor was charged with 2240 gms. of diisobutylene and 42 cc. of anhydrous stannic chloride. Hydrogen sulfide was bubbled into the solution. A rise in temperature was noted and soon a white cloud appeared and later a yellow precipitate formed which turned yellowish brown in its final stage. The reaction flask was cooled with running tap water, the temperature inside the flask being about 40–50° C. After 4 hrs. the temperature began to fall and the reaction was stopped after 5 hrs. The reaction mixture was steam distilled yielding 2535.3 gms. of organic layer which came over with 3 liters of water. Continuation of steam distillation carried over a small layer of organic material which was discarded.

The above organic layer was distilled, without drying, through a glass helices packed column. The pure diisobutyl mercaptan boiling 76–77° C./50 mm. weighed 2286.4 gms., which corresponds to 75% of the theoretical yield.

Example 4

In a glass flask was placed 2240 gms. of diisobutylene and 15 cc. of anhydrous stannic chloride. The mixture was stirred and hydrogen sulfide passed into the solution. The temperature of the reactants was kept at 40–50° C. by cooling the flask with running water. After 3 hrs. there was no more heat of reaction and the hydrogen sulfide flow was discontinued after an additional ½ hour.

The mixture was filtered to remove the yellowish-brown precipitate which had formed during the reaction. This precipitate will be called A. The filtrate was steam distilled to recover the mercaptan; 1675 gms. of organic layer was obtained with 3200 cc. of water. The organic layer was fractionally distilled giving 1326.5 gms. of pure mercaptan or 45% of the theoretical yield. The boiling point of the mercaptan was 76–77° C./50 mm.

The precipitate A was divided into two approximately equal portions. One-half was washed with petroleum ether and dried. Thirteen grams of finely divided yellowish-brown solid was obtained which analyzed as follows: 58.09% tin, 7.44% chlorine, 26.01% sulfur; another analysis gave 63.9% tin.

Example 5

One-half of precipitate A of Example 4 was added to 224 gms. of diisobutylene in a glass flask and hydrogen sulfide bubbled in. The temperature rose to 90° C. with heat of reaction. After no more heat of reaction was liberated the mixture was filtered and the mercaptan was isolated by steam distillation and fractionation as in the previous example. The precipitate which was removed by filtration was used in another identical experiment. This was repeated two more times, making five times in all that the catalyst was used with apparently very little loss in activity. The yields of pure isolated diisobutyl mercaptan were: 43%, 45%, 47% and 38% of theoretical. The mercaptan from each experiment had a boiling point of 74–77° C./50 mm. and $n_D^{20}=1.4538$–1.4540. The precipitate from the last experiment was washed and dried; the analyses are: 60.27% tin, 1.84% chlorine.

Example 6

A continuous reactor was used for the preparation of mercaptan from hydrogen sulfide and olefins. A glass tube 3½ ft. x 1¼ inches was filled with pumice. When diisobutylene is dropped in the top of the tower and hydrogen sulfide gas is passed through tower, the liquid collected at the bottom of the tower contains no diisobutyl mercaptan but is essentially unchanged diisobutylene.

A solution of 10% by wt. of $SnCl_4$ in diisobutylene was dropped in at the top of the tower. Hydrogen sulfide gas was simultaneously passed through the tower. A white precipitate first formed on the pumice which later turned yellow. The temperature of the reaction zone rose to about 40° C. The liquid obtained from the bottom of the column was washed and fractionally distilled to recover 56% of the liquid as pure diisobutyl mercaptan.

Fresh diisobutylene containing no catalyst was dropped into the continuous reactor with a stream of hydrogen sulfide gas and the liquid collected at the bottom of the reactor contained 21% of mercaptan as determined by fractional distillation. Enough catalyst had obviously remained on the pumice packing to catalyze the reaction between the olefin and hydrogen sulfide.

Example 7

A solution of liquid hydrogen sulfide was prepared by mixing 70 g. thereof in 100 cc. of chloroform. This solution was then treated with about 5 cc. of anhydrous liquid stannic chloride. 70 g. of trimethyl ethylene were then added to the above mixture at —80° C. The excess of $H_2S$ was then allowed to distill off at room temperature whereupon the residue was distilled at atmospheric pressure. The fraction distilling between 95° C. and 105° C. was extracted several times with dilute aqueous sodium hydroxide.

On acidification of the alkaline extract, the mercaptan separated as a colorless oil. The latter was fractionated at atmospheric pressure, the major part of it distilling at 97–100° C. 9 g. of product, analysis of which indicated it to be practically pure tertiary amyl mercaptan, was obtained. This corresponds to 8.7% yield based on the olefin used.

Example 8

A glass reactor was charged with 140 gms. of diamylene (prepared by polymerization of trimethylethylene) and 10 cc. of anhydrous stannic chloride. The temperature rose from 25 to 45° C.; indicating that some polymerization must have taken place. When the temperature began to fall, hydrogen sulfide was bubbled through the solution then again rose to 55° C. and this temperature was maintained for ½ hr., after which time it started to decrease. The addition of hydrogen sulfide was continued another hour after which the product was steam distilled. The organic layer, weighing 133.4 gms., was obtained with 500 cc. of water in the distillate. The organic layer obtained thereafter was very small and was discarded. The organic layer was dried over anhydrous $K_2CO_3$, filtered and fractionally distilled to obtain 48.9 gms. of mercaptan boiling at 98–103° C./25 mm. which corresponds to 28% of the theoretical yield. The refractive index of diamyl mercaptan is about 1.469–1.474 and the analyses are as follows:

| Found: | Calcd. for $C_{10}H_{21}SH$: |
|---|---|
| 68.70% C | 68.91% C |
| 12.67% H | 12.63% H |
| 17.49% S | 18.39% S |

The foregoing description contains a limited number of embodiments of the present invention but it will be understood that the present invention is not limited to the specific conditions disclosed since numerous variations are possible without departing from the scope of the present invention as defined in the following claims.

What I claim and desire to secure by Letters Patent is:

1. The process of preparing mercaptans which comprises reacting an olefin with hydrogen sulfide under non-oxidizing conditions in the presence of a stannic halide.

2. The process of preparing mercaptans which comprises reacting monoolefins with hydrogen sulfide under non-oxidizing conditions in the presence of a stannic halide.

3. The process of preparing mercaptans which comprises reacting tertiary monoolefins with hydrogen sulfide under non-oxidizing conditions in the presence of a stannic halide.

4. The process of preparing mercaptans which comprises adding a stannic halide to a monoolefin and bubbling hydrogen sulfide therethrough under non-oxidizing conditions.

5. The process of preparing mercaptans which comprises adding a stannic halide to a tertiary monoolefin, bubbling hydrogen sulfide therethrough under non-oxidizing conditions at a temperature below about 25° C. and separating mercaptans from the resultant reaction mixture.

6. The process of preparing mercaptans which comprises mixing liquid hydrogen sulfide with a suitable inert diluent, adding a stannic halide thereto and adding a monoolefin to the resultant mixture under non-oxidizing conditions.

7. The process of preparing mercaptans which comprises reacting an olefin with hydrogen sulfide under non-oxidizing conditions in the presence of a stannic chloride.

8. The process of preparing mercaptans which comprises reacting monoolefins with hydrogen sulfide under non-oxidizing conditions in the presence of a stannic chloride.

9. The process of preparing mercaptans which comprises reacting tertiary monoolefins with hydrogen sulfide under non-oxidizing conditions in the presence of a stannic chloride.

10. The process of preparing mercaptans which comprises adding a stannic chloride to a monoolefin and bubbling hydrogen sulfide therethrough under non-oxidizing conditions.

11. The process of preparing mercaptans which comprises adding a stannic chloride to a tertiary monoolefin, bubbling hydrogen sulfide therethrough under non-oxidizing conditions at a temperature below about 25° C. and separating mercaptans from the resultant reaction mixture.

12. The process of preparing mercaptans which comprises mixing liquid hydrogen sulfide with a suitable inert diluent, adding a stannic chloride thereto and adding a monoolefin to the resultant mixture under non-oxidizing conditions.

13. In the condensation of olefins with hydrogen sulfide to form mercaptans having the sulfhydryl radical attached to a non-terminal carbon atom, the process comprising mixing the olefin with hydrogen sulfide in quantity sufficient to condense with said olefin, and condensing the olefin with the hydrogen sulfide by means of a stannic chloride catalyst, the reaction temperature being maintained below 90° C. and the stannic chloride catalyst being the principal and essential catalytic constituent of the reaction mixture.

14. In the condensation of open chain olefins with hydrogen sulfide to form mercaptans having the sulfhydryl radical attached to a nonterminal carbon atom, the process comprising effecting the condensation reaction by contacting the olefin with the hydrogen sulfide in stoichiometric excess in the presence of a stannic chloride catalyst, the reaction temperature being maintained below 90° C. and the stannic chloride catalyst being the principal and essential catalytic constituent of the reaction mixture.

LOUIS A. MIKESKA.

REFERENCES CITED

The following references are of record in the file of this patent:

UNITED STATES PATENTS

| Number | Name | Date |
|---|---|---|
| 2,101,096 | Reuter | Dec. 7, 1937 |
| 2,137,584 | Ott | Nov. 22, 1938 |
| 2,159,511 | Pier | May 23, 1939 |
| 2,224,071 | Wasserman | Dec. 3, 1940 |
| 2,296,399 | Otto | Sept. 22, 1942 |
| 2,352,435 | Hoeffleman | June 27, 1944 |
| 2,366,453 | Meadow | Jan. 2, 1945 |
| 2,434,510 | Olin et al. | Jan. 13, 1948 |